US011982198B2

(12) United States Patent
Josse et al.

(10) Patent No.: US 11,982,198 B2
(45) Date of Patent: May 14, 2024

(54) ANNULAR COMPONENT FOR SUPPORTING A TURBINE ENGINE BEARING

(71) Applicant: SAFRAN HELICOPTER ENGINES, Bordes (FR)

(72) Inventors: Albert Josse, Moissy-Cramayel (FR); Lois Pierre Denis Vive, Moissy-Cramayel (FR); Jean-Maurice Casaux-Bic, Moissy-Cramayel (FR); Yvan Ludovic Lameignere, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 62 days.

(21) Appl. No.: 17/596,343

(22) PCT Filed: Jun. 4, 2020

(86) PCT No.: PCT/FR2020/050953

§ 371 (c)(1),
(2) Date: Dec. 8, 2021

(87) PCT Pub. No.: WO2020/249887

PCT Pub. Date: Dec. 17, 2020

(65) Prior Publication Data

US 2022/0220865 A1 Jul. 14, 2022

(30) Foreign Application Priority Data

Jun. 12, 2019 (FR) ....................................... 1906249

(51) Int. Cl.
*F01D 25/16* (2006.01)
*F01D 25/28* (2006.01)

(52) U.S. Cl.
CPC ........... *F01D 25/162* (2013.01); *F01D 25/28* (2013.01); *F05D 2220/323* (2013.01);
(Continued)

(58) Field of Classification Search
CPC ...... F01D 25/162; F01D 25/164; F01D 25/28; F01D 9/041; F05D 2250/183;
(Continued)

(56) References Cited

U.S. PATENT DOCUMENTS 5,483,792 A * 1/1996 Czachor ................ F01D 25/162
60/805
9,500,088 B2 * 11/2016 Schlemmer ............... F01D 5/28
(Continued)

FOREIGN PATENT DOCUMENTS

DE 102007025006 A1 4/2008
FR 2956695 A1 8/2011
(Continued)

OTHER PUBLICATIONS

International Search Report received for PCT Patent Application No. PCT/FR2020/050953, dated Oct. 14, 2020, 5 pages (2 pages of English Translation and 3 pages of Original Document).

*Primary Examiner* — Topaz L. Elliott
*Assistant Examiner* — Jesse M Prager
(74) *Attorney, Agent, or Firm* — WOMBLE BOND DICKINSON (US) LLP

(57) ABSTRACT

A component (1, 2) for supporting at least one bearing (3) for a turbine engine (10) comprising: two coaxial walls, internal (4) and external (5) walls respectively, defining a gas flow vein (6) between them and interconnected by a row of arms (7); an external ferrule (50) comprising an internal peripheral edge (51) connected to the external wall (5) and an external peripheral edge (52) connected to an external mounting flange (53); an internal ferrule (40) comprising an external peripheral edge (41) connected to the internal wall (4) and an internal peripheral edge (42) comprising an internal mounting flange (43); at least one of the ferrules (4, 5), which at the peripheral edge (41, 51) thereof is connected to the corresponding wall (4, 5), having a general shape
(Continued)

which is corrugated about an axis (X-X) of the component (1, 2).

18 Claims, 5 Drawing Sheets

(52) U.S. Cl.
CPC .... *F05D 2240/50* (2013.01); *F05D 2250/141* (2013.01); *F05D 2250/184* (2013.01); *F05D 2250/291* (2013.01); *F05D 2250/61* (2013.01); *F05D 2260/30* (2013.01)

(58) Field of Classification Search
CPC ......... F05D 2250/184; F05D 2220/323; F05D 2240/50; F05D 2250/18; F05D 2250/141; F05D 2250/291; F05D 2250/61; F05D 2260/30; F02C 7/06
See application file for complete search history.

(56) References Cited

U.S. PATENT DOCUMENTS

| | | | | |
|---|---|---|---|---|
| 9,970,320 | B2 * | 5/2018 | De Sousa | F01D 25/243 |
| 2004/0240987 | A1 * | 12/2004 | Czachor | F01D 9/065 415/142 |
| 2008/0276621 | A1 * | 11/2008 | Somanath | F01D 25/162 415/213.1 |
| 2010/0303608 | A1 | 12/2010 | Kataoka et al. | |
| 2012/0321447 | A1 | 12/2012 | Dijoud et al. | |
| 2015/0000306 | A1 | 1/2015 | Perronnet et al. | |
| 2015/0033759 | A1 * | 2/2015 | Sjoqvist | F01D 25/16 60/796 |

FOREIGN PATENT DOCUMENTS

| | | | |
|---|---|---|---|
| FR | 2986040 | A1 | 7/2013 |
| FR | 3072749 | A1 | 4/2019 |

* cited by examiner

ANNULAR COMPONENT FOR SUPPORTING A TURBINE ENGINE BEARING

TECHNICAL FIELD OF THE INVENTION

The field of the present invention is that of aeronautical turbine engines and more particularly that of their components participating in the support of the bearings of their shaft.

BACKGROUND

Aeronautical turbine engines, whether single or multi-spools, generally comprise one or more structural annular components, also known as bearing supports, which support the bearing(s) on which the rotating shafts of these spools rotate. Such annular components may support the power shaft driven by a free turbine in the case of a turbine engine. Such annular components may also provide a seal between the free turbine (FT) and High Pressure (HP) stages.

In the case of annular components for supporting the rear bearing(s), these are subject to relatively high thermal stresses. In fact, they are attached to an external structure of the engine by a flange which is located in a cold zone; whereas their median part, in the form of a channel, is traversed by the engine gases and is therefore located in a particularly hot zone. Towards the inside of the engine, the annular components are attached to a set of components forming a structure carrying the shaft support bearing(s), known as the "bearing housing". This structure carrying the shaft is also located in a relatively cold area that is bathed in the cooling air of the engine and by lubrication oil of the bearing. It is therefore necessary to take into account the differential radial displacements that may occur during operation as a result of these temperature differences between the various parts making up these annular bearing support components.

To this end, the annular components for supporting the bearings are generally in the form of an annular duct through which radial arms pass and through which the gases pass. These components are extended toward the outside and the inside by two shells with complex geometries, known as "pins". These pins allow to connect the rigid median part through which the gases pass to the bearing housing supporting the bearings of the rotor to the outside structure of the turbine engine, while allowing radial displacements caused by temperature differences.

In the current state, these annular components therefore have shells with complex axisymmetric geometries to ensure sufficient bearing stiffness. These shells can include "lunulae" (also called openings) to ensure the passage of auxiliaries, such as oil ducts, which pass through the radial arms leading to a local non-axisymmetry. Examples of embodiments of such annular components to increase their service life are described in patent applications FR-A1-2 956 695 or FR-A1-2 986 040. The first application teaches a flexible element to ensure sufficient flexibility of the pins of the bearing support. The second application proposes a particular arrangement of the tubular arms, inclining them in the axial and tangential direction (with respect to the central axis of the bearing), to obtain a radial rigidity and high flexion.

In the particular case of an architecture incorporating an annular bearing support component with an axisymmetric architecture with lunulae, additional sealing elements are incorporated to ensure sealing between the upstream and downstream sides of the annular support component.

This also results in a loss of performance of the turbine engine due to a less robust and unreliable sealing. In addition, the sealing elements add space and design constraints of the annular component.

Another drawback of this type of annular component is that there is a quasi-axisymmetric stress field at the axisymmetric shells of the component, even in the presence of the radial arms. As a result, rapid crack propagation after a fatigue initiation phase can lead to the failure of the annular component and thus the loss of the holding of the rotating elements of the bearing housing.

Finally, an annular bearing support component is complex to produce, particularly by the casting technique, and therefore has a high manufacturing cost. In addition, its mechanical reliability in operation can also lead to significant additional costs, which result either in numerous repairs or in premature disposal. In addition, this annular component presents assembly constraints (in particular by its axial root) with the other elements of the environment (shaft, fixing flanges, auxiliary ducts, etc.).

In this context, it is interesting to overcome the disadvantages of the prior art, by proposing an annular bearing support component with optimised mechanical strength and longevity, while allowing its simple and rapid assembly in a turbine engine.

SUMMARY OF THE INVENTION

The present invention aims to overcome one or more drawbacks of the prior art by providing a solution that is simple, effective and economical.

The invention thus proposes an annular bearing support component for at least one bearing, for a turbine engine, in particular for an aircraft, comprising:

- two coaxial annular walls, internal and external respectively, these walls delimiting between them a gas flow vein and being connected together by an annular row of arms;
- an external annular shell extending around the external annular wall, this shell comprising an internal peripheral edge connected to the external annular wall and an external peripheral edge connected to an external annular fixing flange, referred to as "external flange";
- an internal annular shell extending inside the internal annular wall, this shell comprising an external peripheral edge connected to the internal annular wall and an internal peripheral edge comprising an internal annular fixing flange, referred to as "internal flange";
- the annular component being characterised in that at least one of the shells has its external or internal peripheral edge connected to the corresponding annular wall and has a generally corrugated shape around an axis of the annular component.

Thus, this solution achieves the above-mentioned objective. Thanks to the corrugations of the connecting edge of at least one of the shells, it is possible to reduce their dimensions in particular, and/or to eliminate the lunulae for the passage of auxiliaries, thus eliminating losses of sealing in the event of the lunulae being eliminated.

Indeed, corrugations can easily be designed thanks to the specific and predetermined arrangement of the non-axisymmetrical components of the annular component, such as the solid or tubular arms, the shells and the lunulae, which enable to form a path for the passage of auxiliaries and around which the corrugations can be made. Thus, it is not necessarily necessary to use additional sealing elements to compensate for the permeability created by the lunulae and the space requirement of the annular support component can be greatly reduced. Furthermore, the corrugations inherently create a non-axisymmetry, particularly at the connecting edge of at least one of the shells, allowing a localised state of thermomechanical stress to be created. This state of stress is optimal for designing this component with robustness by slow propagation of a crack at the end of a fatigue initiation phase, so as to optimise the service life of the annular support component and its robustness in service. It should be noted that this configuration is also a means for limiting the above-mentioned axisymmetric assembly stresses, which also contributes to reinforcing the mechanical strength and longevity of the annular support component.

According to another feature, only one of the shells has its external or internal peripheral edge corrugated and connected to the corresponding annular wall.

According to another feature, the other of the shells has its external or internal peripheral edge connected to the corresponding annular wall, this external or internal peripheral edge has a generally circular shape around the axis of the component; this shell having openings which are through openings and which are aligned substantially circumferentially with the arms.

According to another variant, the internal and external shells each have their external or internal peripheral edge connected to the corresponding annular wall, which is corrugated.

According to another feature, the arms are hollow for the passage of auxiliaries.

According to another feature, the annular walls each comprise an annular row of holes which are through holes and open into the arms.

According to another feature, said circular peripheral edge of the other of the shells extends in a plane perpendicular to the axis and passing through the holes of the annular wall to which this edge is connected.

According to another variant, said circular peripheral edge of the other of the shells extends in a plane inclined with respect to the axis of the annular component and passing through the holes of the annular wall to which this edge is connected.

According to another feature, the corrugated peripheral edge comprises hollow portions and hump portions, each hollow portion extending around a hole of the annular wall to which that edge is connected, and each hump portion extending between two adjacent holes of that wall.

According to another feature, the holes of the annular wall to which the corrugated peripheral edge is connected are undersized relative to those of the other wall.

According to another feature, the corrugated peripheral edge forms corrugations of constant amplitude.

According to another feature, the corrugated peripheral edge forms corrugations of variable amplitude.

In this configuration, the amplitude and/or the angular position of the corrugations are variable so as to provide more or less non-axisymmetry on the connecting edge of at least one of the shells in order to reduce the state of thermomechanical stress and reinforce the mechanical strength of the annular component or adjust the stiffness of the bearing support assembly.

According to another feature, the maximum amplitude of the corrugation is between 10% and 90%, and more particularly between 15% and 20% (corrugated external shell) or between 70% and 90% (corrugated internal shell), in relation to a total length of the arms measured along the axis of the annular component.

The amplitude of the corrugated edge is, for example, chosen as a function of several parameters linked to the environment of the turbine engine, such as: the position and direction of the shells (internal or external) of the component, the length of the arms, the position of the external fixing flange and/or the type of turbine engine or even the levels of thermomechanical stress and stiffness of the bearing support.

The invention also proposes an aircraft turbine engine comprising at least one annular support component for at least one bearing according to one of the features of the invention.

BRIEF DESCRIPTION OF THE FIGURES

The invention will be better understood and other details, features and advantages of the invention will become clearer on reading the following description made by way of non-limiting example and with reference to the attached drawings in which.

DETAILED DESCRIPTION OF THE INVENTION

By convention in the present application, the terms "inside" and "outside", and "internal" and "external" are used in reference to a positioning with respect to an axis X-X of rotation of a turbine engine. For example, a cylinder extending along the axis X-X of the engine comprises an inside surface facing the engine axis and an outside surface opposite its inside surface. "Longitudinal" or "longitudinally" means any direction parallel to the axis X-X, and "transversely" or "transversal" means any direction perpendicular to the axis X-X. Similarly, the terms "upstream" and "downstream" are defined in relation to the direction of airflow in the turbine engine.

Figure 1:
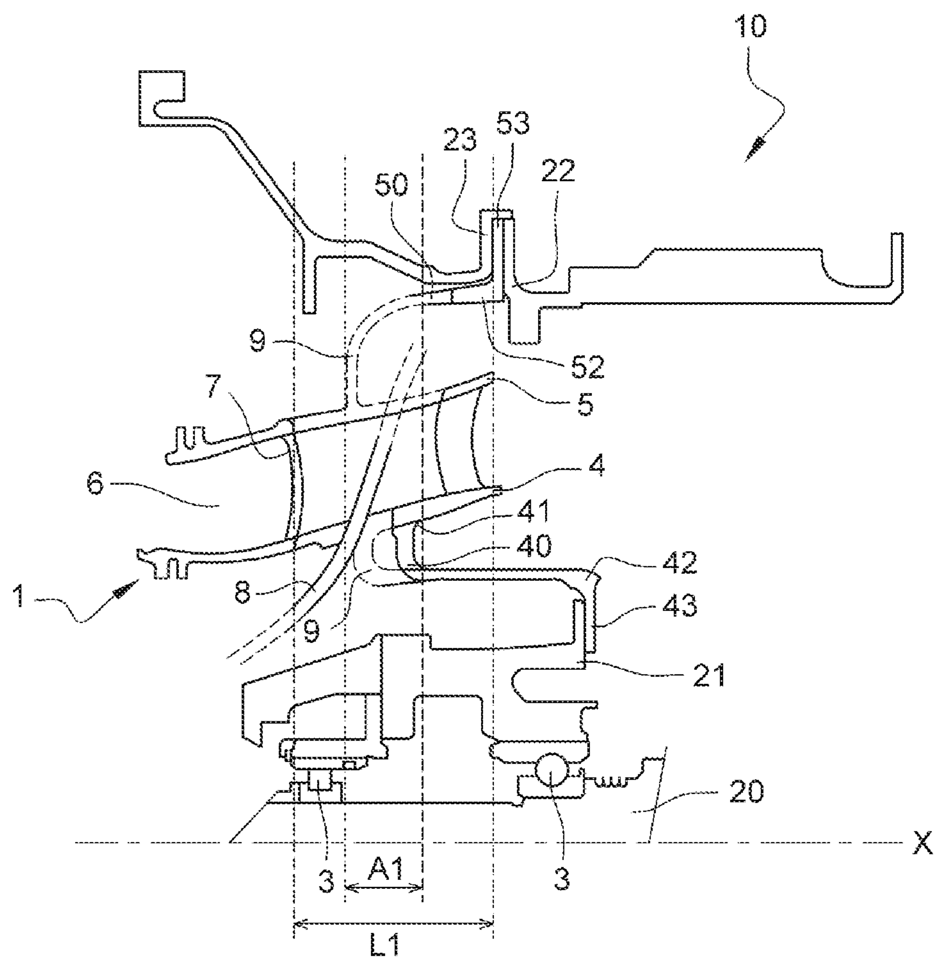
FIG. 1 is a schematic half-view in axial section of a component of a turbine engine in which an annular support component for at least one bearing is arranged, according to a first embodiment of the invention.

FIG. 1 illustrates component of a turbine engine 10, such as an aircraft turboshaft engine, comprising an annular component 1 for supporting bearings 3 of the invention, which enables to guide a shaft 20 driven by a turbine arranged downstream of this annular component 1. The gases, coming from a gas generator (not shown), pass through a flow vein 6 of this component 1.

The component 1 is connected, on the one hand, to a set of elements 22, 23 of an external structure of the turbine engine 10, and on the other hand, to an internal structure 21 carrying the bearings 3 of the turbine engine 10. Downstream of this component 1, the gases pass through, for example, a free turbine stator and then a free turbine wheel to which they transmit their energy (not shown). This free turbine wheel is mechanically connected to the shaft 20, which is guided by the bearings 3 and which recovers the power from the turbine engine. These bearings 3 are carried by the internal structure 21 which is connected to the component 1 of the invention.

Figure 2:
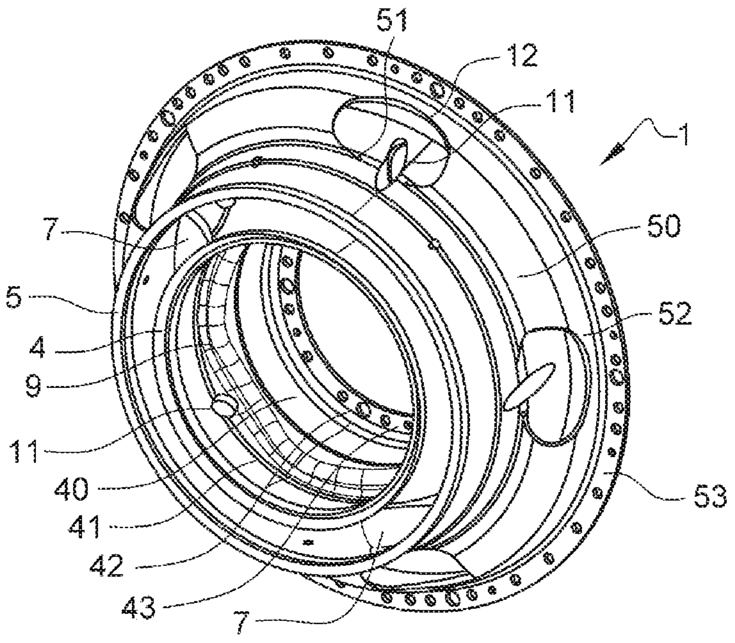
FIG. 2 is a schematic perspective view of the annular component shown in FIG. 1.
Figure 3:
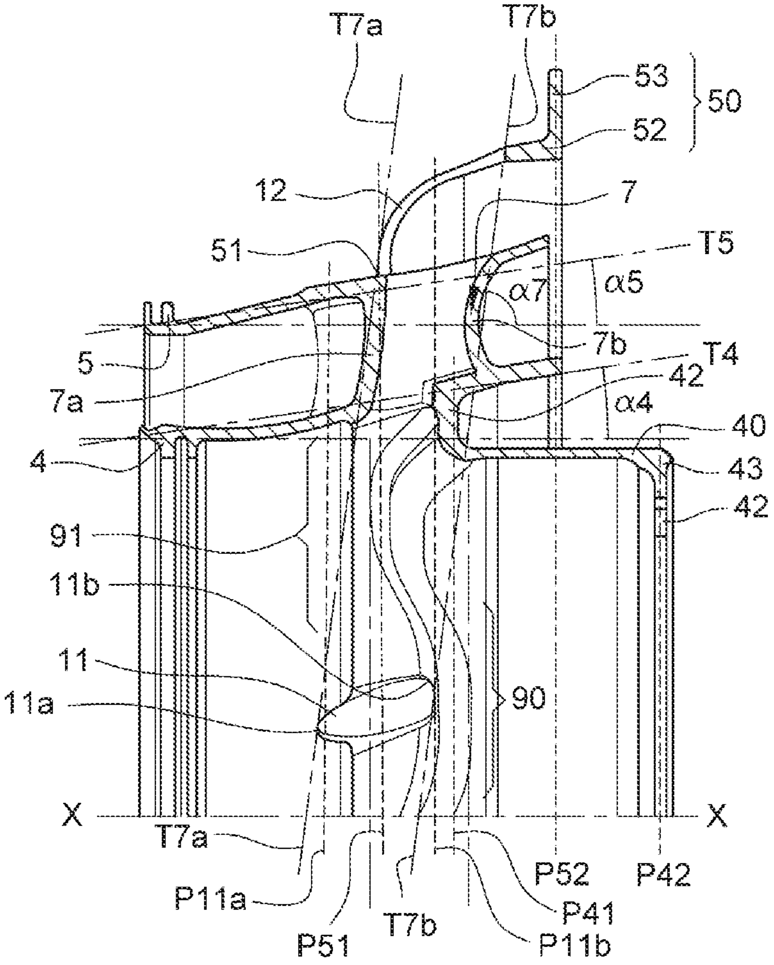
FIG. 3 is a schematic half-view in axial section of the annular component of FIGS. 1 and 2.
Figure 4:
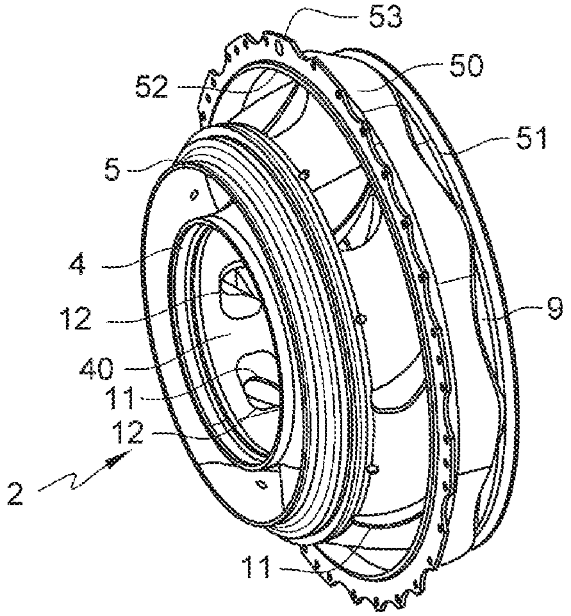
FIG. 4 is a schematic perspective view of an annular support component according to a second embodiment of the invention.
Figure 5:
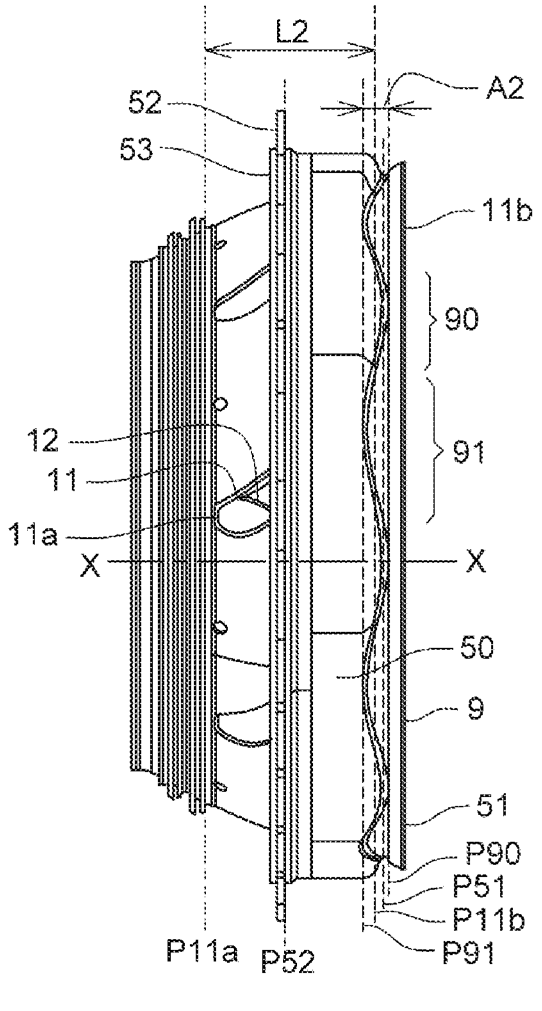
FIG. 5 is a schematic side view of the annular component of FIG. 4.

FIGS. 1 to 3 illustrate a first embodiment of the component 1 and FIGS. 4 to 5 illustrate a second embodiment of this component 2.

According to the first embodiment, the component 1 has a shape of revolution extending around an axis which is coincident with the axis X-X of the turbine engine.

With reference to FIG. 2, the component 1 comprises two annular walls, respectively internal 4 and external 5, which are connected to each other by arms 7. These arms 7 may be solid or tubular (or otherwise said to be hollow) for example for the passage of auxiliaries 8. This component 1 further comprises an internal annular shell 40 extending radially inside the internal annular wall 4 and an external annular shell 50 which extends around the external annular wall 5.

The internal annular shell 40 comprises an external peripheral edge 41 connected to the internal annular wall 4 and an internal peripheral edge 42 coprising an internal fixing flange 43. This internal flange 43 may be connected by fastening means (such as bolts) to a flange of the internal structure 21 of the turbine engine 10, as shown for example in FIG. 1.

The external annular shell 50 comprises an internal peripheral edge 51 connected to the external annular wall 5 and an external peripheral edge 52 comprising an external fixing flange 53. This external flange 53 may also be connected by fastening means (such as bolts) to flanges of the external structure 22, 23 of the turbine engine 10, as shown in FIG. 1.

In the example shown, the external edge 41 connected to the internal wall 4 comprises corrugations 9 arranged around the axis X-X, while the internal edge 51 connected to the external wall 5 has a generally circular shape.

The external shell 50 comprises openings 12 (or "lunulae" as mentioned above) which are through openings and are substantially radially aligned with the arms 7.

The walls 4, 5 comprise holes 11 which also are through holes and which open into the arms 7. The arms 7, openings 12 and holes 11 are at least partially aligned substantially radially with each other, for example to allow the passage of auxiliaries 8, as illustrated for example in FIG. 1. Non-limitingly, the holes 11 are dimensioned so as to have a substantially smaller area than the openings 12. The dimensions of the holes 11 and the openings 12 are for example chosen according to the overall size of the component 1 for supporting the bearing, the rotational speed of the shaft 20, the need for the passage of the auxiliary 8, the levels of mechanical loading, in particular for the openings and the type of turbine engine 10.

With reference to FIG. 3, the elements composing the component 1 are described in detail with respect, on the one hand, to several planes perpendicular P to the axis X-X and parallel to each other, and on the other hand, to several tangent planes T which are oblique to the axis X-X and form angles of inclination α.

The internal wall 4 and external wall 5 each extend along a tangent plane, respectively plane T4 and plane T5. The internal wall 4 is thus inclined in an oblique direction to the axis X-X forming an angle of inclination α4, and the external wall 5 is inclined in an oblique direction to the axis X-X forming an angle of inclination α5.

Each arm 7 extends radially between the internal wall 4 and the external wall 5 and may be inclined in an oblique direction with respect to the axis X-X forming an angle of inclination α7. The arm 7 comprises an internal cavity bounded by a wall 7*a* located upstream to form a leading edge of the arm and passing through a tangent plane T7*a*, and a wall 7*b* located downstream to form a trailing edge and passing through a tangent plane T7*b* parallel to plane T7*a*.

The internal shell 40 extends substantially axially and comprises, on the upstream side, the external edge 41 which passes through a plane P41, and, on the downstream side, the internal edge 42 which passes through a plane P42. This internal shell 40 extends substantially radially, on the one hand, towards the outside through the plane P41 of the external edge 41 connecting the internal wall 4, and on the other hand, towards the inside through the plane P42 which comprises the internal flange 43. In axial section, the internal shell 40 connected to the internal wall 4 comprises a curved shape with a concavity directed downstream.

The external shell 50 extends substantially axially and comprises on the upstream side the internal edge 51 passing through a plane P51, and on the downstream side the external edge 52 passing through a plane P52. This external shell 50 extends substantially radially toward the outside through the plane P52 which comprises the external flange 53. In axial cross-section, the external shell connected to the external wall 5 comprises a half-arc curved shape with a concavity directed downstream. The plane P41 of the internal shell 40 connected to the internal wall 4 is disposed between the planes P51 and P52 of the external shell 50, and the plane P42 of the internal edge 42 of the internal shell 40 is disposed downstream of the plane P52 of the external shell 50.

In the example shown, the opening 11 has a generally elongate shape extending between an upstream end 11*a* passing substantially through plane T7*a* and a downstream end 11*b* passing substantially through plane T7*b*, such that this opening in the internal wall 4 opens into the internal cavity of the arm 7. Similarly, the opening 12 also extends upstream to downstream between tangent planes T7*a* and T7*b*, such that this opening in the external wall 5 opens into the internal cavity of the arm 7.

In particular, the plane P41 of the internal shell 40 connected to the internal wall 4 is arranged between the planes T7*a* and T7*b* of the arm 7, and closer to the plane T7*b* of the wall 7*b* than to the plane T7*a* of the wall 7*a*. The external edge 41 of the internal shell 40, which passes through this plane 41, therefore partially closes the internal cavity of the arm 7 and the downstream end 11*b* of the hole. The plane P51 of the external shell 50 connected to the external wall 5 is almost joined to the plane T7*a* of the wall 7*a* of the arm by the internal edge 51.

The corrugated edge 41 comprises hollow portions 90 and hump portions 91 alternately to form corrugations 9 between the planes P41 and P51. Each hollow portion 90 is disposed around a hole 11, preferably around the downstream end 11*b* and passing substantially through a plane P11*b*. The hump portion 91 is arranged between two adjacent holes 11.

Advantageously, the corrugations 9 comprise an amplitude A1 substantially similar to a total length L1 of the arm 7 measured along the axis X-X (FIG. 1). This amplitude A1 may be constant or variable depending on the size and/or position, respectively similar or different, of the arms 7. In FIGS. 1 and 2, the arms 7, five in number, are substantially of the same size and arranged equidistant from each other, so that the corrugations 9 have a constant amplitude around the axis X-X. The annular component 1 may comprise more or less than five arms depending on the functional requirement of this component in the turbine engine.

FIGS. 4 and 5 illustrate the second embodiment. The component 2 is distinguished from the component 1 by the external edge 41 connected to the annular wall 4 which has a generally circular shape, whereas the internal edge 51 comprises corrugations 9 arranged around the axis X-X. This corrugated edge 51 extends in a plane P51 downstream of the component 2 and perpendicular to the axis X-X, and the external edge 52 extends in a plane P52 upstream which is parallel to P51. The internal shell 40 comprises openings 12 which are through openings and which are substantially radially aligned with the arms 7. The annular walls 4, 5 comprise holes 11 which are through holes and which open into the arms 7. The arms 7, the openings 12 and the holes 11 are also at least partially radially aligned with each other to allow the passage of auxiliaries 8. The openings 12 are different in shape and size from the holes 11.

The holes 11 in the external annular wall 5 are elongate in shape similar to an aircraft wing having a leading edge which is the front of the airflow profile and a trailing edge which is the rear of the airflow profile. Thus comparably, the hole 11 comprises an upstream end 11*a* passing through a plane P11*a* perpendicular to the axis X-X and forming a leading edge, and a downstream end 11*b* passing through a plane P11*b* perpendicular to the axis X-X and forming a trailing edge. The downstream end 11*b* is smaller and also axially and radially offset from the upstream end 11*a* of the hole. Thus, the upstream end 11*a* of the hole is sufficiently large to allow the auxiliary passage 8, while the downstream end 11*b* of the hole is close to the edge 51 connected to the external wall 5 to allow the formation of the corrugations 9.

In particular, the corrugations 9 also comprise hollow portions 90 and hump portions 91. Each hollow portion 90 comprises a hollow passing through a plane P90 and located close to the downstream end 11*b* of the hole, so as to circumvent this hole. Each hump portion 91 comprises an apex passing through a plane P91 and located substantially between two downstream ends 11*b* of two adjacent holes.

Advantageously, the corrugations 9 comprise an amplitude A2 of between 15% and 20%, with respect to a total length L2 of the arm 7 measured along the axis X-X. This amplitude A2 of the corrugations 9 may be constant or variable depending on the dimensioning, respectively similar or different, of the arms 7. In FIGS. 4 and 5, the arms 7 are substantially of the same size and arranged equidistant from each other, so that the corrugations 10 have a constant amplitude around the axis X-X of the component.

In these two embodiments, the corrugations of the connecting edge of at least one of the shells create a non-axisymmetry to compensate for the quasi-axisymmetric stress field at this shell, while reinforcing the sealing of the component.

The annular components 1, 2 of the invention can be made by casting or by additive manufacturing. It should be noted that the creation of the corrugations on the annular component does not introduce any major manufacturing problems. For example, the casting process allows the corrugations to be produced without introducing any prohibitive additional cost in series production.

The annular components for supporting the bearings of the invention provide several advantages compared to the prior art, in particular:

- improving the sealing by eliminating the openings at the level of the shells of the annular support component;
- reliably and stably maintain the bearings of the turbine engine shafts;
- ensure efficient auxiliary passage, e.g. for the bearings of the rotating elements of the internal structure carrying the bearings;
- guarantee stress containment in the shells in order to limit crack propagation during the fatigue initiation phase;
- guarantee mechanical resistance under thermomechanical stress or vibratory positioning in the conditions of the engine in operation;
- easily adaptable to current bearings.

In general, the annular bearing support component with the corrugations of the connecting edge of at least one of the shells improves the performance of the engine and limits aerodynamic disturbances in the gas flow vein of the turbine engine. The proposed solutions are simple, effective and economical to produce and assemble on a turbine engine, while ensuring optimum mechanical strength and life of the annular component for supporting the bearings.

The invention claimed is:

1. An annular component of supporting at least one bearing, for a turbine engine, comprising:

two coaxial annular walls, internal and external respectively, these walls delimiting between them an annular gas flow vein and being connected together by an annular row of arms;

an external annular shell extending around the external annular wall, the external annular shell comprising an internal peripheral edge connected to the external annular wall and an external peripheral edge connected to an external flange;

an internal annular shell extending inside the internal annular wall, the internal annular shell comprising an external peripheral edge connected to the internal annular wall and an internal peripheral edge comprising an internal flange, wherein at least one of the internal or external annular shells has its external or internal peripheral edge which is connected, respectively, to the internal or external annular wall around an axis of the annular component, and wherein a corrugated shape of the external peripheral edge which is connected to the internal annular wall, has an amplitude similar to a total length of arms measured along the axis of the annular component; or a corrugated shape of the internal peripheral edge which is connected to the external annular wall, has an amplitude between 15% and 20% of a total length of arms measured along the axis of the annular component.

2. The annular component according to claim 1, wherein a first annular shell selected from the internal and external annular shells has a first peripheral edge selected from the external or internal peripheral edge which has the corrugated shape and which is connected, respectively, to the internal or external annular wall.

3. The annular component according to claim 2, wherein a second annular shell selected from the internal and external annular shells has a second peripheral edge selected from the external or internal peripheral edge which is connected, respectively, to the internal or external annular wall, the second peripheral edge has a circular shape around the axis of the annular component, the second annular shell having openings which are through openings and which are aligned circumferentially with the arms.

4. The annular component according to claim 1, wherein the internal and external annular shells each have their external or internal peripheral edge connected, respectively, to the internal or external annular wall, which is corrugated.

5. The annular component according to claim 1, wherein the arms are hollow for the passage of auxiliaries.

6. The annular component according to claim 1, wherein the internal and external annular walls each comprise an annular row of holes which are through holes and which open into the arms.

7. The annular component according to claim 3, wherein the internal and external annular walls each comprise an annular row of holes which are through holes and which open into the arms and said second peripheral edge which is in circular shape extends in a plane perpendicular to the axis and passing through the holes of the second annular wall to which said second peripheral edge is connected.

8. The annular component according to claim 3, wherein the internal and external annular walls each comprise an annular row of holes which are through holes and which open into the arms and said second peripheral edge which is in circular shape extends in a plane inclined with respect to the axis of the annular component and passing through the holes of the second annular wall to which second peripheral edge is connected.

9. The annular component according to claim 6, wherein the corrugated peripheral edge comprises hollow portions and hump portions, each hollow portion extending around a hole of the annular wall to which that edge is connected, and each hump portion extending between two adjacent holes of that wall.

10. The annular component according to claim 1, wherein the corrugated peripheral edge forms corrugations of constant amplitude.

11. The annular component according to claim 1, wherein the corrugated peripheral edge forms corrugations of variable amplitude.

12. An annular component of supporting at least one bearing, for a turbine engine, comprising:

two coaxial annular walls, internal and external respectively, said walls delimiting between them an annular gas flow vein and being connected together by an annular row of arms;

an external annular shell extending around the external annular wall, the external annular shell comprising an internal peripheral edge connected to the external annular wall and an external peripheral edge connected to an external flange;

an internal annular shell extending inside the internal annular wall, the internal annular shell comprising an external peripheral edge-connected to the internal annular wall and an internal peripheral edge and an internal flange;

wherein at least one of the internal or external annular shells has its external or internal peripheral edge which is connected, respectively, to the internal or external annular wall around an axis of the annular component, wherein a first annular shell selected from the internal and external annular shells has a first peripheral edge selected from the external or internal peripheral edge and is connected, respectively, to the internal or external annular wall, wherein a second annular shell selected from the internal and external annular shells has a second peripheral edge selected from the external or internal peripheral edge which is connected, respectively, to the internal or external annular wall, the second peripheral edge has a circular shape around the axis of the annular component, the second annular shell having openings which are through openings and which are aligned circumferentially with the arms, wherein only the first peripheral edge has a corrugated shape, and wherein the external and internal annular wall each comprise an annular row of holes which are through holes and which open into the arms, wherein the holes have a smaller area than the openings.

13. A turbine engine, for an aircraft turbine engine, comprising at least one annular component according to claim 1.

14. The annular component according to claim 1, wherein the external annular shell has the internal peripheral edge which is connected to the external annular wall and which has the corrugated shape around the axis of the annular component, and/or wherein the internal annular shell has the external peripheral edge which is connected to the internal annular wall and which has the corrugated shape around the axis of the annular component.

15. The annular component according to claim 12, wherein the corrugated shape of the external peripheral edge which is connected to the internal annular wall, have an amplitude similar to a total length of arms measured along the axis of the annular component.

16. The annular component according to claim 12, wherein the corrugated shape of the internal peripheral edge which is connected to the external annular wall, have an amplitude between 15% and 20% of a total length of arms measured along the axis of the annular component.

17. The annular component according to claim 3, wherein the external and internal annular wall each comprise an annular row of holes which are through holes and which open into the arms, wherein the holes have a smaller area than the openings.

18. The annular component according to claim 12, wherein the maximum amplitude of the corrugated shape is between 10% and 90% in respect to a total length of the arms measured along the axis of the annular component.

* * * * *